United States Patent [19]
Ostrovsky et al.

[11] Patent Number: 6,167,392
[45] Date of Patent: Dec. 26, 2000

[54] METHOD AND APPARATUS FOR PRIVATE INFORMATION RETRIEVAL FROM A SINGLE ELECTRONIC STORAGE DEVICE

[75] Inventors: Rafail Ostrovsky, Secaucus, N.J.; Eyal Kushilevitz, Haifa, Israel

[73] Assignees: Telcordia Technologies, Inc., Morristown, N.J.; Technion R&D Foundation Ltd., Haifa, Israel

[21] Appl. No.: 09/087,893

[22] Filed: Jun. 1, 1998

Related U.S. Application Data

[60] Provisional application No. 60/061,632, Oct. 9, 1997.

[51] Int. Cl.[7] .................................................. G06F 17/30
[52] U.S. Cl. ..................... 707/2; 707/3; 707/9; 707/10; 707/101
[58] Field of Search ............................... 707/9, 10, 3, 2, 707/101

[56] References Cited

U.S. PATENT DOCUMENTS

| | | | |
|---|---|---|---|
| 5,692,177 | 11/1997 | Miller ....................................... | 395/608 |
| 5,778,395 | 7/1998 | Whiting et al. ........................... | 707/204 |
| 5,855,018 | 12/1998 | Chor et al. ................................ | 707/9 |
| 5,991,414 | 11/1999 | Garay et al. .............................. | 380/25 |

OTHER PUBLICATIONS

B. Chor, O. Goldriech, et. al, "Private Information Retrieval" 36th Annual IEEE Symposium on Foundations of Computer Science, 1995.

A. Ambainis– Upper Bound on the Communication Complexity of Private Information Retrieval, 24th ICALP, Springer, Lecture Notes in Computer Sciences, vol. 1256.

B. Chor and N. Gilboa, "Computationally Private Information Retrieval", 29th Symposium on the Theory of Computing.

R. Ostrovsky and V. Shoup, "Private Information Storage", 29th Symposium on the Theory of Computing.

*Primary Examiner*—Jean R. Homere
*Attorney, Agent, or Firm*—Joseph Giordano

[57] ABSTRACT

A method and apparatus for privately retrieving information from a single electronic storage device (e.g., a database) is described. An inquiring processor identifies a portion of a database memory with information for retrieval and encodes address of the information into a preselected mathematical function that conceals the identity of the selected information from the database. The inquiring processor transmits the encoded function to the database. The database cooperates by executing the encoded function on the database and transmits an encoded result that represents an evaluation of the encoded function to the inquiring processor. The inquiring processor, having knowledge of the selected mathematical function, decodes the encoded result to generate the information from the selected memory section of the database. The inquiry can be repeated until the inquiring processor can retrieve the selected information. The process minimizes the exchange of information between the database and the inquiring processor that is necessary to privately retrieve information.

18 Claims, 5 Drawing Sheets

| 1 | 2 | 3 | 4 | N |
|---|---|---|---|---|
| KEY 1 | KEY 2 | KEY 3 | • • • | KEY N |
| VALUE 1 | VALUE 2 | VALUE 3 | • • • | VALUE N |

| 1 | 2 | 3 | 4 | N |
|---|---|---|---|---|
| KEY 2 ($log_n$) | KEY 3 ($log_n$) | KEY 1 ($log_n$) | KEY N ($log_n$) | • • • |
| VALUE 2 | VALUE 3 | VALUE 1 | VALUE N | • • • |

DATABASE MEMORY

FIG. 5A

| 1 | 2 | 3 | 4 | N |
|---|---|---|---|---|
| KEY 1 | KEY 2 | KEY 3 | · · · | KEY N |
| VALUE 1 | VALUE 2 | VALUE 3 | · · · | VALUE N |

FIG. 5B

| 1 | 2 | 3 | 4 | N |
|---|---|---|---|---|
| KEY 2 ($\log_n$) | KEY 3 ($\log_n$) | KEY 1 ($\log_n$) | KEY N ($\log_n$) | · · · |
| VALUE 2 | VALUE 3 | VALUE 1 | VALUE N | · · · |

METHOD AND APPARATUS FOR PRIVATE INFORMATION RETRIEVAL FROM A SINGLE ELECTRONIC STORAGE DEVICE

CROSS-REFERENCE TO RELATED APPLICATIONS

This application claims the benefit of U.S. Provisional Application No. 60/061,632, filed Oct. 9, 1997.

FIELD OF THE INVENTION

The present invention relates to information retrieval from an electronic storage device, and in particular, to private retrieval of information from a single electronic storage device.

BACKGROUND OF THE INVENTION

With the advancement of Internet communications, the need for private information retrieval is increasing. For example, if company X maintains an Internet website with a complete listing of its United States and foreign patents, competitors may be interested in searching those patents when introducing competitive products or services. Without privacy from the inquirer, company X can monitor database inquiries into its patent portfolio and gain knowledge as to the identity of the patents in which the competitors are interested. Thus, it can be very important to privatize database information inquiries.

Private information retrieval ("PIR") schemes allow a user to retrieve information from an electronic storage device while maintaining the privacy of the queries from the electronic storage device. As used herein, "electronic storage device" refers to any processing system that stores information that a user at an inquiring processor may wish to retrieve. Moreover, the terms "electronic storage device" and "database" will be used interchangeably and should be understood in their broadest sense.

The least sophisticated method for performing a private information retrieval is to request a copy of the entire database. This, of course, hides the particular information sought by the inquiring processor, but requires an impractical exchange of information between the database and the inquiring processor.

Another technique for PIR requires replication of the database at alterative sites that do not communicate with one another. This replication technique is disclosed in B. Chor, O. Goldreich, et al., "Private Information Retrieval," 36th Annual IEEE Symposium On Foundations Of Computer Science, 1995, A. Ambainis, "Upper Bound On The Communication Complexity Of Private Information Retrieval," Proceedings Of 24th ICALP, Springer, Lecture Notes In Computer Science, Volume 1256, B. Chor and N. Gilboa, "Computationally Private Information Retrieval," 29th Symposium On The Theory Of Computing, and R. Ostrovsky and V. Shoup, "Private Information Storage," 29th Symposium On The Theory Of Computing. This technique requires replication of the database into two or more copies that cannot communicate with each other in order to assure privacy of user requests. However, it is not practical to maintain several copies of a database, where the copies cannot communicate with each other.

Accordingly, it is an object of the invention to improve the efficiency and effectiveness of private information retrieval schemes. It is a further object of the invention to provide private information retrieval from a database, without requiring replication of the information in several databases. It is a further object of the invention to provide private information retrieval from a database using relatively small amounts of data exchange between the database and an inquiring processor. Other objects and advantages of the invention will be apparent from the descriptions of the invention that follows.

DESCRIPTION OF THE INVENTION

To achieve these and other advantages and in accordance with the purposes of the invention, as embodied and broadly described, the invention includes a method of privately retrieving selected information from an electronic storage device, without requiring replication of the database. The method comprises the steps, executed by an inquiring processor, of identifying a section of the database that contains the selected information; encoding the section into a mathematical function, represented as a sequence of instructions, that does not reveal the section to the database; communicating the mathematical function to the database; executing the mathematical function at the database, transmitting the results to the inquiring processor; and decoding the results at the inquiring processor, wherein the total amount of information exchanged between the database and the inquiring processor is less than the total amount of information stored in the database.

In accordance with the invention, the above steps can be repeated as necessary until the inquiring processor can read the desired information.

In addition, the invention also includes a method of privately searching an electronic storage device based on a search request from an inquiring processor, where the nature of the search request or the result of the search request remains hidden from the storage device.

It is to be understood that both the foregoing general description and the following detailed description are exemplary and explanatory and are not intended to provide further explanation of the invention as claimed.

BRIEF DESCRIPTION OF THE DRAWINGS

FIG. 5A is a block diagram of a database memory, in accordance with another embodiment of the present invention; and FIG. 5B is a block diagram of a hash table, in accordance with one embodiment of the present invention.

BEST MODE FOR CARRYING OUT THE INVENTION

Reference will now be made in detail to the construction and operation of preferred implementations of the present invention which are illustrated in the accompanying drawings.

The following description of the preferred implementations of the present invention is only exemplary of the present invention. The present invention is not limited to these implementations, but may be realized by other implementations.

Figure 1:
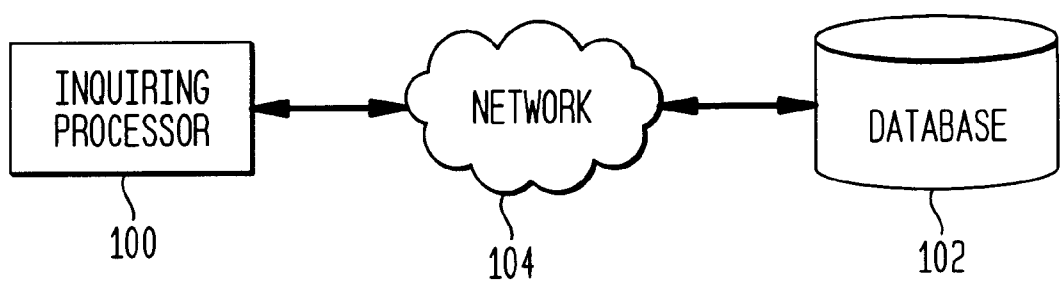
FIG. 1 is a block diagram of an inquiring processor connected to a database via a network, in accordance with one embodiment of the present invention.

FIG. 1 is a block diagram of a network configuration that connects an inquiring processor to a database. Inquiring processor 100 may comprise any form of computer capable of implementing the generation of a mathematical function, which may be represented as a sequence of instructions, and then decoding the resulting answer provided by database 102. Inquiring processor 100 can preferably be programed with appropriate application software to implement the methods and processes described herein.

Database 102 preferably includes any conventional database or any set of records, or data one or more of which inquiring processor 100 wishes to retrieve. Database 102 should also be capable of executing application software to implement the methods and processes described herein.

Network 104 comprises any conventional communications network either internal or external, for affecting communication between an inquiring processor 100 and a database 102. Network 104 may comprise, for example, an internal local area network or a large external network, such as the Internet.

In accordance with the general principles of the present invention, relative addresses of information to be retrieved from a portion of or an entire database can be effectively hidden from the database by concealing the address information in a mathematical function that hides or conceals the address of the records or data requested by inquiring processor 100. Database 102 applies the function to the relevant portion of database 102, and returns the results back to inquiring processor 100.

Figure 2:
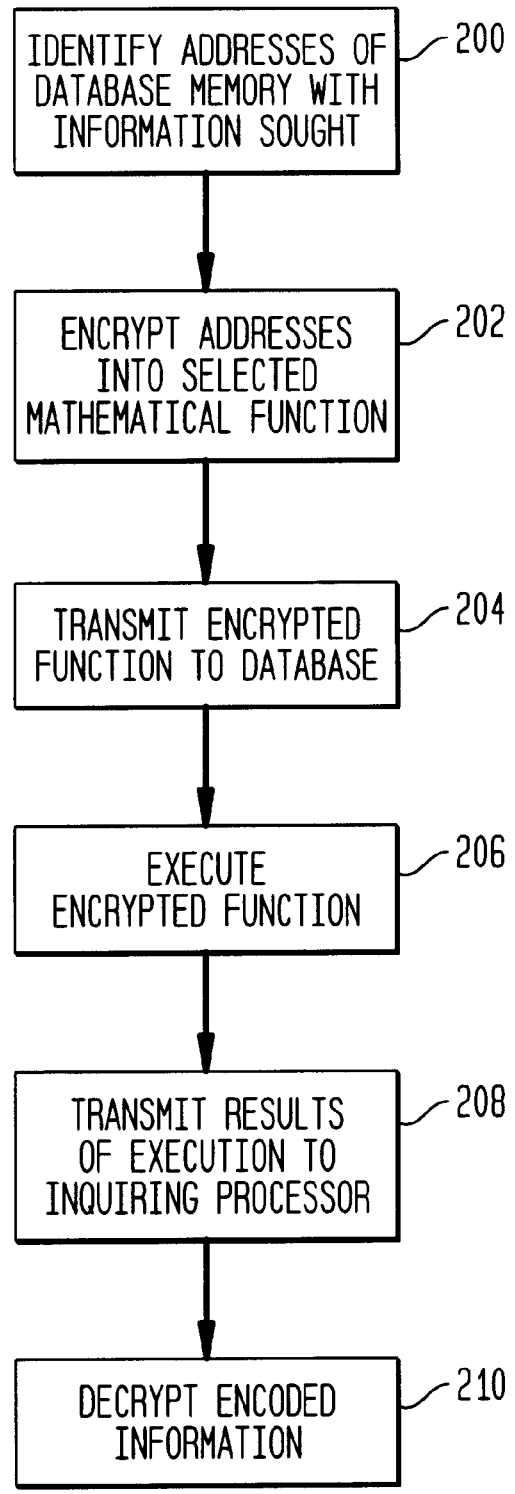
FIG. 2 is a process flow diagram showing a method of private information retrieval, in accordance with one embodiment of the present invention.

FIG. 2 is a flow processing diagram illustrating the operation of an inquiring processor 100 and a database 102 to implement the general system operation for a private information retrieval, in accordance with one embodiment of the invention. Initially, inquiring processor 100 identifies the addresses of the database memory that contain the information sought (step 200). Inquiring processor 100 then encodes the addresses into a selected mathematical function (step 202). An example of such a mathematical function is described below. Inquiring processor 100 then transmits the encoded function to database 102 (step 204).

Database 102 receives the encoded function and executes it (step 206). Database 102 knows that it is manipulating the stored data, but database 102 cannot determine which particular information is being sought by inquiring processor 100. Database 102 then transmits the results of the execution of the mathematical function against database 102 to inquiring processor 100 through the network 104 (step 208). Once inquiring processor 100 receives the encoded information, inquiring processor 100 decodes the encoded information in accordance with the information inquiring processor 100 used to originally encode the address information into the mathematical function (step 210). The decode operation returns the encoded information to, for example, binary information which inquiring processor 100 can read and understand.

The above steps 200–210 can be repeated as necessary if inquiring processor 100 cannot retrieve the desired information with a single query. For example, inquiring processor 100 may generate a sequence of functions each of which may be dependent upon the results of a previous function received from database 102.

In accordance with one embodiment of the invention, inquiring processor 100 may use, for example, a quadratic residuosity assumption ("QRA") to guarantee the security of the addresses of the data encoded into the mathematical function, which inquiring processor 100 transmits to database 102. Alternatively, instead of QRA, inquiring processor 100 may, for example, use any other homomorphic encryption function to achieve the same functionality. QRA is, generally, defined as follows:

A set $Z_N^*$ is defined for a natural number N as follows:

$$Z_N^* = \{1 \leq x \leq N, \text{ greatest common divisor } (N,x)=1\}.$$

The quadratic residuosity predicate is defined as follows: $Q_N(y)=0$ if $\exists w \in Z_N^*$, such that $w^2 = y \bmod N$ and $Q_N(y)$ is equal to 1 otherwise, y is a quadratic residue ("QR") mod N if $Q_N(y)=0$ (i.e. y is a "square"), and y is a quadratic non-residue ("QNR") if $Q_N(y)=1$ (i.e., y is a "non-square"). The problem is considered "hardest" when N is a product of two distinct primes of equal length k/2; thus the "hard set" (indexed by k) is $$H_k = \{N | N = P_1 \cdot P_2 \text{ where } P_1, P_2 \text{ are } k/2\text{-bit primes}\}$$

If the factorization of $N \in H_k$ is known, computing $Q_N(y)$ can be done in $O(|N|^3)$ time. (y/N) denotes the Jacobi symbol. For all N (i.e., even for $N \in H_k$) the value of (y/N) can be computed in time polynomial in $|N|$ even without knowing the factorization of N. For $N \in H_k$, if (y/N)=−1 then y is always a QNR while among the y's such that (y/N)=+1 exactly half are QNRs and half are QRs. Thus, consider only $N \in H_k$, and only y's such that (y/N)=+1. Thus, define $Z_N^{+1}$+e, dus $\Delta \{y \in Z_N^* | (y/N)=1\}$. For any x,y in $Z_N^{+1}$ their product xy is a QNR if exactly one of them is a QNR; that is, $Q_N(xy) = Q_N(x) \oplus Q_N(y)$. Finally, to pick a random QR in $Z_N^{+1}$, pick a random $r \in Z_N^*$ and computer $r^2$ (for doing this one clearly does not need to know the factorization of N).

QRA means that for every constant c, and every family of polynomial size circuits $C_k(.,.)$, there exists an integer K such that for all k>K $$\text{Prob}_{N \in_R H_k; \, y \in_R Z_N^{+1}}(C_k(N,y)=Q_N(y)) < \tfrac{1}{2} + 1/k^c,$$

where $_{N \in_R H_k; \, y \in_R Z_N^{+1}}$, denotes the experiment of first drawing two k/2-bit primes $p_1$, $P_2$ and compute $N = p_1 \cdot p_2$, and then drawing y uniformly at random from $Z_N^{+1}$.

Database 102 may be represented as a s×t matrix of bits, denoted M. Inquiring processor 100 is interested in retrieving privately the bit of database 102, which can be denoted as the (a,b) entry of the matrix M. The basic scheme works as follows:

1. Inquiring processor 100 starts by picking at random a k-bit number $N \in H_k$ (i.e., it picks at random two k/2-bit primes and multiples them). Inquiring processor 100 sends N to database 102, (but keeps its factorization secret).

2. Inquiring processor 100 chooses uniformly at random t numbers $y_1, \ldots, y_t \in Z_N^{+1}$ such that $y_b$ is a QNR and $y_j$, for $j \neq b$, is a QR. Inquiring processor 100 sends these t numbers to database 102 (total of t·k bits).

3. Database 102 computes for every row r a number $z_r \in Z_N^*$ as follows: It first computes (in $Z_N^*$)

$$w_{r,j} = \begin{cases} y_j^2 & \text{if } M_{r,j} = 0 \\ y_j & \text{if } M_{r,j} = 1 \end{cases}$$

and then database 102 computes $$z_r = \prod_{j=1}^{t} w_{r,j}.$$

The observation here is that if $j \neq b$ then $W_{r,j}$ is always a QR, while if $j=b$ then $W_{r,j}$ is QR iff $M_{r,j}=0$ (and it is a QNR otherwise). Therefore, $z_r$ is a QR iff $M_{r,b}=0$ (and $z_r$ is a QNR otherwise).

4. Database 102 sends $z_1, \ldots, z_s$ to inquiring processor 100 (total of s·k bits).
5. Inquiring processor 100 considers only the number $Z_a$, corresponding to the row of M which contains the bit it is interested in. This number is a QR iff $M_{a,b}=0$ (and it is a QNR otherwise). Since inquiring processor 100 knows the factorization of the number N, inquiring processor 100 can efficiently check whether $Z_a$ is a QR and by this retrieve the bit $M_{a,b}$.

In another embodiment, a computational PIR scheme with a lower communication complexity may be used. Specifically, in this embodiment Inquiring processor 100 and database 102 use a recursive scheme, although the scheme may use a single round (i.e., Inquiring processor 100 sends a query to database 102, receives an answer, and retrieves from the answer the desired bit).

Consider the basic scheme with steps 1–5 disclosed above. In step 4 of the basic scheme, database 102 sends s k-bit numbers $z_1, \ldots, z_s$ to inquiring processor 100. Inquiring processor 100 is only interested in one of these numbers, $Z_a$. However, inquiring processor 100 cannot disclose this information (the index a) to database 102 as this will violate the privacy constraint. Thus, the k numbers may be viewed as a s·k bit string so that inquiring processor 100 can get the k bits of this string in which inquiring processor 100 is interested.

More formally, the basic scheme defined above may be represented by $S_1$. Now, the scheme $S_l$, may be recursively defined as follows. $n_l$ may denote the number of bits when database 102 executes $S_l$, ($n_L=n$). Let $t_l$ be the number of columns in the matrix used by the scheme $S_l$ to represent the string (and $S_l=n_l/t_l$). $S_l$ may be obtained by replacing Step 4 of the basic scheme by the following step:

4. Inquiring processor 100 and database 102 execute k times the scheme $S_{l-1}$. In each of these executions, inquiring processor 100 gets one of the bits of $Z_a$ out of a string of length $n_{l-1}=k \cdot s_l$ held by database 102. After these k executions, inquiring processor 100 has the number $z_a$ that allows the reconstruction of the desired bit, as in Step 5 of the basic scheme.

Note that although the string from which inquiring processor 100 retrieves bits becomes smaller in the recursion, inquiring processor 100 must use the same security parameter $1^k$ given as an input (typically, k will be chosen as a function of n, the size of the original database). On the other hand, step 1 may be executed only once, and inquiring processor 100 can use the same N in all levels of the recursion.

In yet another embodiment, this new version of step 4 may be further improved. This is because when applying k times the scheme $S_{l-1}$ for retrieving the number $Z_a$ out of the information held by database 102, in the first use of $S_{l-1}$ inquiring processor 100 retrieves the most significant bit of $Z_a$, in the second use of $S_{l-1}$ inquiring processor 100 retrieves the second most significant bit of $Z_a$, and so on. Hence, in each of these executions database 102 can be smaller by a factor of k. Thus, the improved step 4 may be stated as follows:

4. Inquiring processor 100 and database 102 execute k times the scheme $S_{l-1}$. In the d-th execution, inquiring processor 100 gets the d-th most significant bit of $Z_a$ out of a string of length $n_{l-1}=s_l$ held by database 102 (that contains the d-th bit of each of $z_1, \ldots, z_{sl}$). After these k executions, inquiring processor 100 has the number $Z_a$ that allows the reconstruction of the desired bit, as in Step 5 of the basis scheme.

Finally, for any level j of this recursive scheme, in all executions of $S_j$ inquiring processor 100 is interested in the same index of the strings (this index depends on i, the index of x retrieved in the upper level of the scheme, and on j). Thus, a further modification to the basic scheme may be stated as follows:

For each level j of the recursion, inquiring processor 100 sends a single query (consisting of $t_j$ numbers). This query serves in all invocations of $S_j$ as the message in Step 2 of the basic scheme.

In yet another embodiment of the invention, the following mathematical relationships for QRs and QNRs may be used:
1. QR·QR=QR;
2. QR·QNR=QNR;
3. QNR·QNR=QR; and
4. QNR·QR=QNR.

Figure 3A:
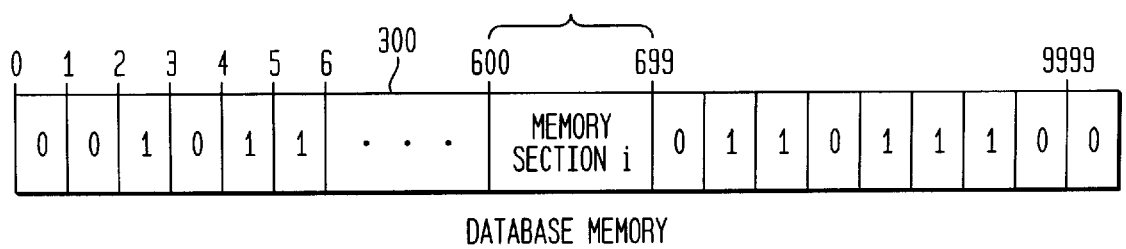
FIG. 3A is a block diagram of a database memory, in accordance with one embodiment of the present invention.

FIG. 3 is a block diagram of a portion of a memory 300 in database 102. For convenience, the database memory 300 includes 10,000 address locations, from 0 to 9999, each containing a single binary bit of information. In this example, a user at the inquiring processor 100 seeks information from memory section i, which has addresses 600–699.

Figure 4:
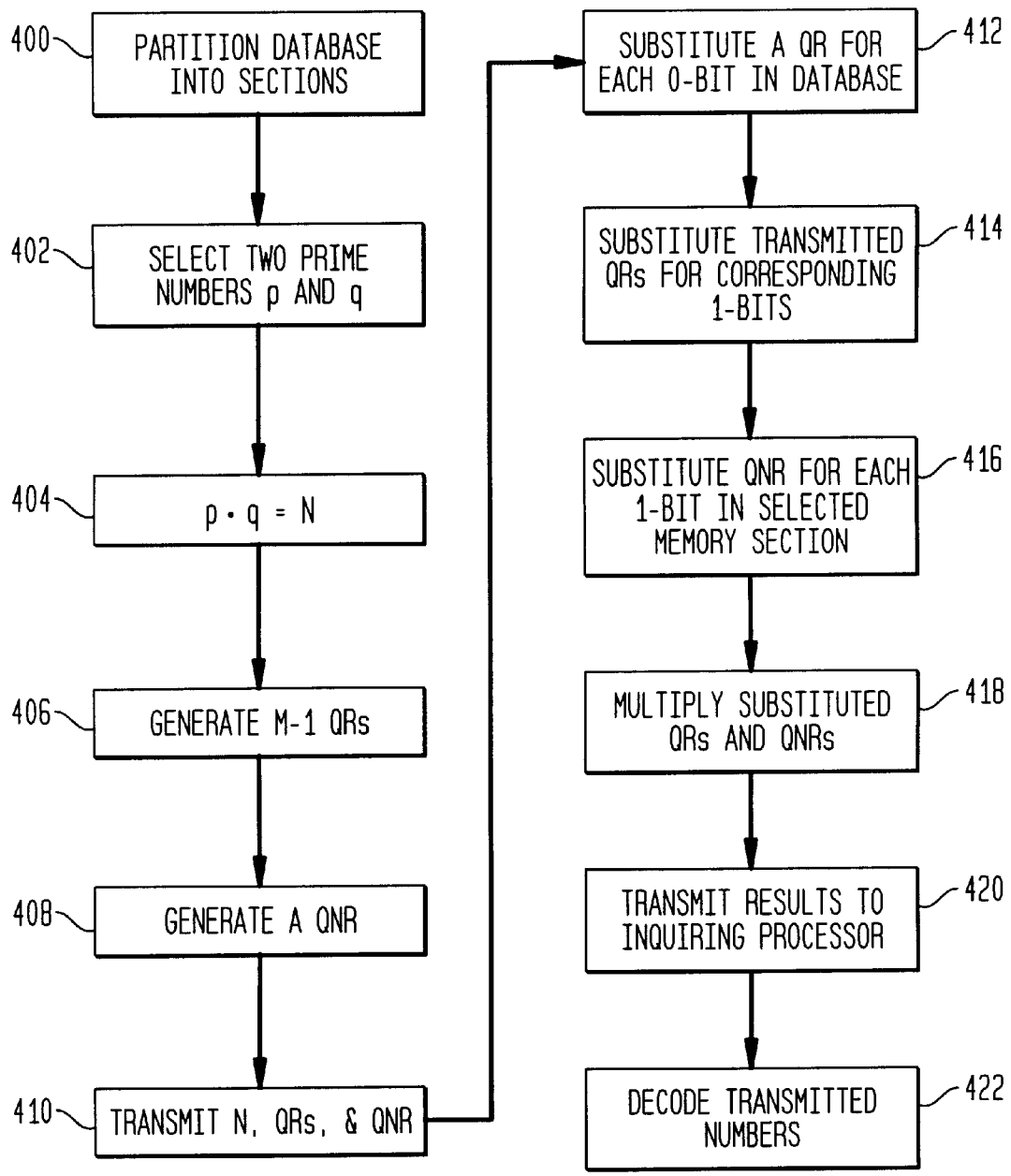
FIG. 4 is a process flow diagram showing another method of private information retrieval, in accordance with another embodiment of the present invention.

FIG. 4 is a processing flow diagram of the methods and procedures executed by inquiring processor 100 and database 102 to perform a private data retrieval in accordance with this embodiment of the present invention. Initially, inquiring processor 100 divides database 102 memory into a number of sequential memory sections S having approximately equal number of addresses (step 400). For example, if database memory 300 includes 10,000 addresses, inquiring processor 100 may divide the memory into 100 sections of 100 addresses. Inquiring processor 100 then selects two prime numbers P and Q (step 402). Inquiring processor 100 selects the prime numbers in set $H_k$ as defined above. Next, the inquiring processor multiples P·Q to obtain N (step 404).

Inquiring processor 100 then generates 99 QR numbers, one less than the number of memory sections MS identified by the inquiring processor. Inquiring processor 100 also generates a QNR number (step 408), and transmits N, the QRs, and the QNR to database 102 in the following order (step 410): Inquiring processor 100 first transmits N, and then transmits QRs and QNRs for each sequential memory section MS. For each sequential memory section S, inquiring processor 100 transmits either a QR or a QNR. For each memory section S, in which inquiring processor 100 is not interested, inquiring processor transmits a distinct QR. For the single memory section i, in which inquiring processor 100 is interested, inquiring processor 100 transmits a QNR.

Database 102 receives these numbers from inquiring processor 100 and performs the following operations. Initially, database 102 generates a translation table of the memory by replacing each 0-bit in the database memory with a QR number (step 412). For each sequential memory section S, database 102 substitutes a 0 bit by a QR number, and for each 1 bit of the sequential memory section MS, database 102 replaces a 1 bit with the number provided by inquiring processor 100 for the section. Thus, in the above example, for all memory sections MS other than memory addresses 600–699, database 102 transforms both the 0 bits and the 1 bits into QRs. For example, for each address including a 1 bit between the addresses of 0 and 99, the database substitutes the first QR number received from inquiring processor 100. For addresses 100–199, the database substitutes the second QR, and so on. For the 1 bits in the selected memory location i, the database substitutes the QNR number that was generated at the inquiring processor (step 416).

Figure 3B:
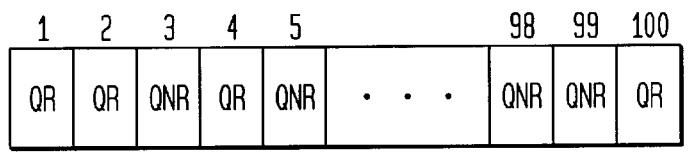
FIG. 3B is a block diagram of an encoded table, in accordance with one embodiment of the present invention.

Database 102 then multiplies the first numbers in each memory section MS together modulo N. Then, database 102 then multiplies the second numbers in each memory section MS together modulo N, and so forth. For example, database 102 multiplies the substituted numbers for address 0, 100, 200, 300, etc. Because selected memory section i is the only memory section that includes QNR numbers, and given the above relationship that QR·QNR=QNR and QR·QR=QR, the results of the multiplication will follow the same QR and QNR values in memory section i. The multiplication, therefore, yields a series of 100 numbers, as shown in FIG. 3B, all of which have a QR value, except for those numbers corresponding to any 1 bits in the selected memory section i. Thus, for example, in FIG. 3B, QNR values at table positions 3, 5, 98 and 99 correspond to 1 bits in the memory section i at addresses 602, 604, 697, and 698, respectively. Database 102 then takes the numbers resulting from the multiplication and transmits them back to the inquiring processor (step 420).

Inquiring processor 100, knowing that QR values correspond to 0 bits and QNR values correspond to 1 bits, decodes the transmitted values using P and Q to yield the information bit stream originally existing in memory section i of the database memory (step 422).

In the above descriptions of the invention, database 102 agrees to cooperate and executes the processes to permit private retrieval. A malicious database 102 operator could, however, manipulate the data to infer whether inquiring processor 100 is after certain data in the database. For example, referring again to a database of patents, the database 102 operator can replace the j-th patent/entry in database 102 with "garbage" and then, after executing the PIR scheme, see if inquiring processor 100 "protests". In this case, the database 102 operator can deduce that the j-th patent was the patent that inquiring processor 100 wants to retrieve.

This experimentation attack can be defeated if inquiring processor 100 can obtain certain accountability from database 102. For example, database 102 can sign (using a variety of representation-efficient signatures) its messages, which can then be used to prove database 102 misbehavior in case of unexpected data.

In addition, when database 102 data comes from a trusted third party, database 102 entries can be augmented, in a natural way, with an authentication mechanism, where inquiring processor 100 can read not only the entry but the authentication as well.

Moreover, database 102 operator can publish (say, in the New York Times) a root of a commitment tree (based on cryptographic hash-function), and then inquiring processor 100 can retrieve (using PIR schemes), not just an entry, but an entire (logarithmic length) path from the root to the desired entry, where again database 102 signs all the messages that database 102 sends to inquiring processor 100. Thus, inquiring processor 100 gets a communication-efficient certificate that the data is in correspondence with the committed value, or a certificate that database 102 has either committed to a wrong data or misbehaved during the protocol execution.

Alternatively, database 102 may also require additional security. For example, if database 102 is a financial enterprise, database 102 may wish to be certain that inquiring processor 100 does not get two entries when inquiring processor 100 and database 102 had agreed in advance that inquiring processor 100 gets only one entry from database 102. Thus, in this alternative embodiment, database 102 may verify whether the information transmitted from inquiring processor 100 includes the "correct" number of QRs and QNRs. This verification may be implemented by, for example, providing to database 102 zero-knowledge proof that the mathematical function meets an agreed upon specification between inquiring processor 100 and database 102 for retrieving data from the database 102 and does not reveal additional information. More generally, inquiring processor 100 may provide a zero-knowledge proof to database 102 that the request from inquiring processor 100 meets an agreed upon specification between database 102 and inquiring processor 100.

In the above embodiment, inquiring processor 100 knows the address of the desired information in database 102. In an alternative embodiment, inquiring processor 100 may not know a specific address in the database 102, but may wish to query database 102 with a search for information. For example, database 102 may include airline reservation information, and inquiring processor 100 may wish to know whether a particular airline offers a flight from New York to San Francisco, and if so, for how much. The present invention permits inquiring processor 100 to perform such queries of database 102 without revealing the queried information to database 102.

FIG. 5A shows an example of database 102 containing information that inquiring processor 100 wishes to query. The information includes, for example, key numbers, 1 through N. Associated with each key number is a value, 1 through N. The key numbers may represent, for example, information to be searched, such as airline departure and destination cities, while the value numbers may represent corresponding information, such as price. The key numbers and value numbers are associated with the corresponding memory addresses 1 thru N. For example, inquiring processor 100 with key q may wish to know if any key in database 102 matches key q, and if so, inquiring processor 100 may wish to know the corresponding value of key q. In this embodiment, inquiring processor 100 can conceal any information about key q including whether a matching record exists in database 102.

In one implementation of this embodiment, database 102 includes application software that performs the following: database 102 chooses a perfect hash function h, which provides a one-to-one correspondence between key values and hash values. Database 102 then sends a description of hash function h to inquiring processor 100. Database 102 reorders its entries according to hash function h. For example, as shown in FIG. 5B, if database 102 applies hash function h to key 1 and if the output of the hash function h is 3, then database 102 puts key 1 and value 1 pair in a new database 102 in location 3. Database 102 performs the same steps for all key value pairs in database 102.

Inquiring processor 100, which previously received a description of hash function h from database 102, applies this hash function to key q. This gives inquiring processor 100 an address in the reordered new database 102 shown in FIG. 5B. Inquiring processor 100 then may perform the steps 200–210 of FIG. 2 (or any other PIR scheme) to retrieve the key-value pair in a private manner and to determine whether the retrieved key is equal to key q, and if so, to determine the corresponding value of the key.

While there has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique, or implementation to the teachings of the present invention without departing from the essential scope of the invention. Therefore, it is intended that this invention not be limited to the particular embodiments and methods disclosed herein, but that the invention include all embodiments falling within the scope of the appended claims.

What is claimed is:

1. A method of privately retrieving selected information from a database that contains the selected information, without requiring replication of said database, said method comprising the steps of:

a) selecting, at an inquiring processor from a set of known data addresses, the addresses of information to be retrieved from said database;

b) encoding, at said inquiring processor, said addresses into a mathematical function that does not reveal to said database the addresses of information to be retrieved;

c) communicating said mathematical function containing encoded addresses to said database;

d) executing said mathematical function against the entirety of said database, and transmitting the results of said execution to said inquiring processor; and e) decoding said results at said inquiring processor, wherein the total amount of information exchanged between said database and said inquiring processor is less than the total amount of information stored in said database.

2. The method of claim 1, wherein said encoding step is based on a quadratic residuosity assumption.

3. The method of claim 1, wherein said encoding step is based on a homomorphic encryption function.

4. The method of claim 1, wherein said transmitting step further comprises the step of authenticating the results.

5. The method according to claim 1, and further comprising the step of repeating steps a)–e) until the decoding step reveals the desired information to said inquiring processor.

6. The method of claim 5, wherein said encoding step is based on a homomorphic encryption function.

7. The method of claim 5, wherein said encoding step is based on a quadratic residuosity assumption.

8. The method of claim 5, wherein said step of transmitting said encoded information further comprises the step of authenticating said encoded information.

9. The method of claim 1, wherein said communicating step further comprises the steps of:

a) forming an agreement between said inquiring processor and said database on a specification for retrieving data from said database;

b) providing, by said inquiring processor, a zero-knowledge proof to said database that the method of privately retrieving meets said agreed upon specification between said inquiring processor and said database.

10. A method of privately retrieving selected information from a database that contains the selected information, without requiring replication of said database, said method comprising the steps of:

a) identifying, at an inquiring processor, the addresses of information to be retrieved from said database;

b) encoding, at said inquiring processor, said addresses into a mathematical function that does not reveal to said database the addresses of information to be retrieved;

c) transmitting said mathematical function containing encoded addresses to said database;

d) executing the mathematical function against the entirety of said database, said execution step further comprising the steps of:

i) translating the data in said database into encoded information corresponding to said function, such that data in said identified addresses is decodable by said inquiring processor but not said database; and ii) transmitting to said inquiring processor said encoded information; and e) decoding said encoded information at said inquiring processor, wherein the total amount of information exchanged between said database and said inquiring processor is less than the total amount of information stored in said database.

11. The method of claim 10, wherein said step of transmitting said mathematical function containing encoded information further comprises the steps of:

a) forming an agreement between said inquiring processor and said database on a specification for retrieving data from said database;

b) providing, by said inquiring processor, a zero-knowledge proof to said database the method of privately retrieving meets said agreed upon specification between said inquiring processor and said database.

12. A method of privately retrieving selected information from a database that contains the selected information, without requiring replication of said database, said method comprising the steps of:

a) identifying, at an inquiring processor, the addresses of information to be retrieved from said database;

b) encoding, at said inquiring processor, said addresses into a mathematical function that does not reveal to said database the addresses of information to be retrieved;

c) transmitting said mathematical function containing encoded addresses to said database;

d) executing the mathematical function against the entirety of said database, said execution step further comprising the steps of:

(i) translating the data in said database into encoded information corresponding to said function, such that data in said identified addresses is decodable by said inquiring processor but not said database; and (ii) transmitting to said inquiring processor said encoded information;

e) decoding said encoded information at said inquiring processor; and f) repeating steps a) through e) until said inquiring processor can read the desired information wherein the total amount of information exchanged between said database and said inquiring processor is less than the total amount of information stored in said database.

13. The method of claim 12, wherein said encoding step is based on a homomorphic encryption function.

14. The method of claim 12, wherein said encoding step is based on a quadratic residuosity assumption.

15. The method of claim 12, wherein said step of transmitting said encoded information further comprises the step of authenticating said encoded information.

16. The method of claim 12, wherein said step of transmitting said mathematical function containing encoded information further comprises the steps of:
   a) forming an agreement between said inquiring processor and said database on a specification for retrieving data from said database;
   b) providing, by said inquiring processor, a zero-knowledge proof to said database that the method of privately retrieving meets said agreed upon specification between said inquiring processor and said database.

17. A method of querying a database from an inquiring database for an address of a selected key without revealing to said database which key is being searched, said method comprising the steps of:
   a) selecting, at said database, a perfect hash function wherein said hash function provides a one-to-one correspondence between stored key values and hash values;
   b) transmitting a description of said hash function to said inquiring processor;
   c) reordering, at said database, database entries according to said hash function;
   d) applying, at said inquiring processor, said hash function to the selected key; and
   e) determining, at said inquiring processor, the address of the selected key in said reordered database.

18. A method of privately retrieving selected information from a database that contains the selected information, without requiring replication of said database, said method comprising the steps of:
   a) identifying, at an inquiring processor, the addresses of information to be retrieved from said database;
   b) encoding, at said inquiring processor, said addresses into a mathematical function that does not reveal the addresses of information to be retrieved to said database;
   c) transmitting said mathematical function containing encoded addresses to said database;
   d) executing the mathematical function against a subset of the entire database defined by said inquiring processor, said execution step further comprising the steps of:
      (i) translating the data in said database into encoded information corresponding to said function, such that data in said identified addresses is decodable by said inquiring processor but not said database; and
      (ii) transmitting to said inquiring processor said encoded information; and
   e) decoding said encoded information at said inquiring processor.

* * * * *